Patented July 1, 1924.

1,499,863

UNITED STATES PATENT OFFICE.

FREDERICK W. FRAHM, OF LOS ANGELES, CALIFORNIA.

SEPARATOR FOR STORAGE BATTERIES.

No Drawing.   Application filed December 1, 1922. Serial No. 604,426.

*To all whom it may concern:*

Be it known that I, FREDERICK W. FRAHM, a citizen of the United States, residing at Los Angeles, in the county of Los Angeles and State of California, have invented new and useful Improvements in Separators for Storage Batteries, of which the following is a specification.

My invention relates to separators for storage batteries, to compositions for use in the making of the same, and to the art of preparing such compositions. The primary object of my present invention is the production of separators for storage batteries which shall be relatively indestructible, highly efficient in use, and capable of production by simple means and at a moderate cost.

Another object of my invention is the production of separators of the character referred to which shall be reasonably capable of withstanding hard knocks, and at the same time pervious to the passage of an electric current, without permitting the undue mixture of the liquids within storage batteries.

In the preparation of my separators I prefer to employ asbestos, sawdust and a sufficient quantity of a solution of rubber in any common solvent, such as gasoline, to render the whole plastic, and I find it advantageous to use three parts asbestos to two parts of coarse sawdust, by weight, preferably mixing the asbestos and the sawdust before associating the solution of rubber therewith. It will be understood that a degree of porosity is indispensable to plates of this character, and that this porosity is obtained by the mentioned use of coarse sawdust associated with asbestos.

It will be understood by those skilled in the art that minor changes in the ingredients and proportions thereof are possible without departing from the spirit of my invention as indicated herein and by the appended claims, and that when the mixture has been prepared as above, it should be subjected to pressure and thereafter vulcanized in a usual manner. I prefer to provide no perforations or corrugations in my separator plates, but I find it advantageous to form them in such molds as will provide vertical channels or grooves therein, these channels tending to increase the surface of the plates and at the same time contribute to their rigidity.

What I claim is:

1. A separator for storage batteries comprising rubber, asbestos and sawdust.

2. A separator for storage batteries comprising rubber, asbestos and sawdust, the sawdust and asbestos being present in approximately the ratio of three parts asbestos to two parts of sawdust, by weight.

3. A separator for storage batteries comprising rubber, asbestos and sawdust, the sawdust and asbestos being present in approximately the ratio of three parts asbestos to two parts of sawdust, by weight, and the whole being thereafter pressed to the desired form and then vulcanized.

4. The process of preparing separators for storage batteries which comprises mixing asbestos with sawdust, adding sufficient of a solution of rubber to render these materials plastic, molding the same and thereafter vulcanizing.

5. The process of preparing separators for storage batteries which comprises mixing asbestos with sawdust in approximately the proportion of three parts of asbestos to two parts of sawdust, adding sufficient of a solution of rubber to render these materials plastic, molding the same in forms adapted to yield a product having vertical grooves and thereafter vulcanizing.

In testimony whereof I have signed my name to this specification.

FREDERICK W. FRAHM.